United States Patent
Murayama et al.

(10) Patent No.: US 6,780,393 B2
(45) Date of Patent: Aug. 24, 2004

(54) METHOD OF PRODUCING FINE PARTICLES OF METAL OXIDE

(75) Inventors: Norimitsu Murayama, c/o National Institute of Advanced Industrial Science and Technology, 3-1, Kasumigaseki 1-chome, Chiyoda-ku, Tokyo 100-8921 (JP); Woosuck Shin, c/o National Institute of Advanced Industrial Science and Technology, 3-1, Kasumigaseki 1-chome, Chiyoda-ku, Tokyo 100-8921 (JP); Sumihito Sago, Nagoya (JP); Makiko Hayashi, Nisshin (JP)

(73) Assignees: National Institute of Advanced Industrial Science and Technology, Tokyo (JP); Noritake Co., Limited, Nagoya (JP); Norimitsu Murayama, Owariasahi (JP); Woosuck Shin, Nagoya (JP)

( * ) Notice: Subject to any disclaimer, the term of this patent is extended or adjusted under 35 U.S.C. 154(b) by 301 days.

(21) Appl. No.: 10/014,558

(22) Filed: Dec. 14, 2001

(65) Prior Publication Data

US 2002/0119093 A1 Aug. 29, 2002

(30) Foreign Application Priority Data

Dec. 27, 2000 (JP) .......................... 2000-399199
Sep. 25, 2001 (JP) .......................... 2001-290782

(51) Int. Cl.⁷ .................. C01F 1/00; C01G 9/00; C01G 19/00; C01G 23/00; C01G 37/00
(52) U.S. Cl. ................. 423/592.1; 423/593.1; 423/335; 423/336; 423/339; 423/605; 423/608; 423/607; 423/632; 423/633; 423/594.19; 423/618; 423/622; 423/624; 423/625; 423/263; 423/636; 423/637; 423/638; 423/639; 423/610; 423/611; 423/612; 423/599; 423/594.12; 423/595; 423/594.1; 423/594.3; 423/594.9; 423/594.14; 423/600; 423/598
(58) Field of Search .................. 423/594, 9, 594.14, 423/600, 598, 592.1, 593.1, 335, 336, 339, 605, 608, 607, 632, 633, 594.19, 618, 622, 624, 625, 263, 636, 637, 638, 639, 610, 611, 612, 599, 594.12, 595, 594.1, 594.3

(56) References Cited

U.S. PATENT DOCUMENTS

5,658,355 A * 8/1997 Cottevieille et al. ....... 29/25.03

FOREIGN PATENT DOCUMENTS

JP      61-122121    * 6/1986
JP      A 7-187668     7/1995

OTHER PUBLICATIONS

"The Stannic Oxide Gas Sensor", CRC Press, 1994, pp. 11–47, no month.

Ying, "Structure and Morphology of Nanostructured Oxides Synthesized by Thermal Vaporization/Magnetron Sputtering and Gas Condensation", *J. Aerosol Sci.*, vol. 24, No. 3, pp. 315–338, 1993, no month.

Fraigi et al., "Comparison between two combustion routes for the synthesis of nanocrystalline $SnO_2$ powders", Material Letters, 47 (2001) pp. 262–266, no month.

Shek et al., "Nanomicrostructure, Chemical Stability and Abnormal Transformation in Ultrafine Particles of Oxidized Tin", *J. Phys. Chem. Solids*, vol. 58, No. 1, pp. 13–17, 1997, no month.

* cited by examiner

*Primary Examiner*—Steven Bos
(74) *Attorney, Agent, or Firm*—Oliff & Berridge, PLC

(57) ABSTRACT

A method of producing fine particles of an oxide of a metal, comprising the steps of: preparing an acidic solution which contains ions of the metal; precipitating fine particles of a hydroxide of the metal by adding an alkaline solution to the acidic solution; collecting the fine particles of the hydroxide of the metal precipitated in a mixed solution of the acidic solution and the alkaline solution; mixing fine particles of a carbon with the collected fine particles of the hydroxide of the metal; and heat-treating a mixture of the fine particles of the hydroxide of the metal and the fine particles of the carbon at a predetermined temperature in a non-reducing atmosphere, whereby the fine particles of the oxide of the metal are produced.

9 Claims, 3 Drawing Sheets

METHOD OF PRODUCING FINE PARTICLES OF METAL OXIDE

This application is based on Japanese Patent Application Nos. 2000-399199 filed Dec. 27, 2000, and 2001-290782 filed Sep. 25, 2001, the contents of which are incorporated hereinto by reference.

BACKGROUND OF THE INVENTION

1. Field of the Invention

The present invention relates in general to a method of producing fine particles of a metal oxide having a nanoscale grain size.

2. Discussion of Related Art

In the field of electronic ceramics, it is desired to reduce the grain size of the materials of the electronic ceramics. In the field of a gas sensor, for instance, it is expected to improve its sensitivity and lower its operating temperature, by reducing the grain size of the material down to the order of several tens of nanometers (nm) for thereby reducing the crystal grain size of the material. In the electronic ceramics such as a varistor and a thermistor which utilize the characteristics of the crystal grain boundaries, the grain boundaries are increased and the characteristics of the electronic ceramics are improved by reducing the crystal grain size and densely sintering the crystal grains. Based on a fact that the reduction of the crystal grain size of a metal oxide results in a quantum effect, it is expected that the finely grained material whose grain size is reduced is used to provide new-type functional ceramics utilizing the quantum effect. Since the above-described effects will appreciably increase with a decrease of the crystal grain size of a sintered body of the metal oxide, it is desirable that the crystal grain size is reduced down to the nanometer scale, in other words, the sintered body of the metal oxide is constituted by the nanocrystal grains. The metal oxide is used as a material of a grinding stone, for instance. The sharpness of cutting edges provided by the abrasive grains increases with a decrease of the crystal grain size of the grinding stone, in other words, with a decrease of the size of the abrasive grains which constitute the grinding stone. When the metal oxide is used as free abrasive grains, the quality of the surface which is subjected to a finish grinding by the free abrasive grains can be increasingly enhanced by reducing the grain size of the metal oxide. It is noted that the term "nanocrystal grains" refers to the crystal grains having a grain size of not greater than about 100 nm. A sintered body in which the nanocrystal grains are densely bonded together is refereed to as "a dense sintered body of nanocrystal grains".

As a method of producing a fine powder as described above, a chemical process using an inorganic salt is known, for instance. This method comprises the steps of: adding an alkaline solution to an aqueous solution of a metal chloride; precipitating a hydroxide of the metal; and heat-treating (calcining) the precipitated hydroxide in a non-reducing atmosphere after it has been dried. This method is described, for instance, in "The Stannic Oxide Gas Sensor" (pp. 11–47) published by CRC Press in 1994. For obtaining a powder of a stannic oxide (tin oxide) used for fabricating a gas sensor, tin tetrachloride ($SnCl_4$) is used as a starting material and an ammonia water is used as the alkaline solution. FIG. 1 shows the conventional process steps for producing the tin oxide. In this method, however, the precipitated hydroxide having a nanoscale grain size is aggregated into an agglomerate after drying, and the nanometer-sized primary grains are fixedly bonded together to form coarse grains (secondary grains) after calcining. Accordingly, even if the product is mechanically pulverized into a powder each time after drying and calcining, the size of the secondary grains obtained by the mechanical pulverization is inevitably greater than about several microns ($\mu$m). Further, the purity of the pulverized powder is undesirably low since impurities get into the powder during the pulverizing operation.

For the purpose of obtaining the fine and highly pure powder of a metal oxide, various methods are proposed. For instance, JP-A-7-187668 proposes a method of oxidizing a graphite intercalation compound obtained by reacting a compound of a specific metal (such as nitrate or oxynitrate) with a graphitic carbon modification. The fine powder of the metal oxide having a high degree of purity is also produced by hydrolysis of an alkoxide material. Further, J. Aerosol Sci., Vol 24 (pp.315–338) published in 1993 describes nanostructured oxides synthesized by thermal vaporization/magnetron sputtering and gas condensation, wherein a metal is subjected to an oxidizing treatment after it has been evaporated and deposited in a vacuum. All of these methods, however, have disadvantages described below. In the method using the graphitic carbon modification, the metal to be used is limited to the one which is capable of forming the graphite intercalation compound. Further, it takes a relatively long period of time to form the graphite intercalation compound, deteriorating the production efficiency. In the method using the alkoxide, the material (alkoxide) is rather expensive for mass-production of the fine powder of the metal oxide. In the gas-phase evaporation method, the rate of formation of the fine power of the metal oxide is considerably low, deteriorating the production efficiency.

Accordingly, the conventional methods described above experience difficulty in mass-producing a fine powder of a metal oxide, making it difficult to use the fine powder of the metal oxide for various applications which require the fine powder. Further, it is difficult to mass-produce a sintered body formed of considerably fine crystals whose grain size is not greater than several tens of nanometers (nm).

SUMMARY OF THE INVENTION

The present invention was developed in the light of the background art described above. It is therefore an object of the invention to provide a method of producing fine particles of a metal oxide having a grain size on the order of nanometer (nm).

The object indicated above may be achieved according to an aspect of the present invention, which provides a method of producing fine particles of an oxide of a metal, comprising the steps of: preparing an acidic solution which contains ions of the metal; precipitating fine particles of a hydroxide of the metal by adding an alkaline solution to the acidic solution; collecting the fine particles of the hydroxide of the metal precipitated in a mixed solution of the acidic solution and the alkaline solution; mixing fine particles of a carbon with the collected fine particles of the hydroxide of the metal; and heat-treating a mixture of the fine particles of the hydroxide of the metal and the fine particles of the carbon at a predetermined temperature in a non-reducing atmosphere, whereby the fine particles of the oxide of the metal are produced.

According to the present method described above, the fine particles of the hydroxide of the metal (the metal hydroxide) which have been precipitated in the mixed solution of the acidic solution and the alkaline solution and collected therefrom are mixed with the fine particles of the carbon, and heat-treated in the non-reducing atmosphere, so that the fine particles of the oxide of the metal (the metal oxide) are produced. In the present method, the fine particles of the carbon are mixed with the fine particles of the metal hydroxide prior to the heat-treatment including the drying and calcining steps in the synthesis of the fine particles of the metal oxide according to the above-described chemical process using the inorganic salt. According to the present method, the fine particles of the carbon which are mixed with the fine particles of the metal hydroxide are effective to prevent the formation of the coarse secondary grains in which the fine particles of the metal hydroxide are bonded together. Accordingly, the present method provides the fine particles of the metal oxide having a nanoscale grain size owing to or derived from the nanoscale grain size of the precipitated metal hydroxide. In the present method described above, the process steps for producing the fine particles of the metal oxide are not complicated as compared with the conventional methods. Further, the present method provides the fine powder of the metal oxide by a simple aqueous synthesis without requiring any special material and equipment, permitting the mass-production of the fine powder of the metal oxide at a relatively low cost without adversely influencing the environment. Thus, the method according to the present invention permits the mass-production of the fine particles of the metal oxide whose grain size is on the order of nanometer (nm). In the conventional chemical process using the inorganic salt described above, the metal chloride used as the starting material is dissolved in a solvent, for thereby preparing the acidic solution. In the present invention wherein the neutralization reaction of the acid and the alkali is utilized to precipitate the metal hydroxide, the acidic solution may be prepared in any manners provided that the prepared acidic solution contains the ions of a specific metal whose oxide is to be obtained by the present method.

For the following reasons, the fine particles of the carbon prevent the fine particles of the metal hydroxide from being bonded together, and accordingly contribute to the formation of the fine powder of the metal oxide. In the heat treatment effected in the conventional method of producing the powder, the primary grains having the nanoscale grain size are bonded together, so that the coarse secondary grains are inevitably formed. If the fine particles of the carbon are mixed with the metal hydroxide, the fine particles of the carbon are heated during the heat treatment, and oxidized into a carbon dioxide gas having a high pressure within the agglomerate of the metal hydroxide. Accordingly, the secondary grains in the dry state are pulverized into the primary grains having the grain size of several tens of nanometers (nm) by the generated gas pressure. The thus obtained primary grains are oxidized into the fine particles of the metal oxide. Since the fine particles of the carbon are burnt out, the fine particles of the carbon which have been added to the metal hydroxide do not remain within the obtained fine particles of the metal oxide, avoiding a risk of deteriorating the purity of the fine particles of the metal oxide.

In one preferred form of the present invention, the fine particles of the carbon are mixed with the fine particles of the hydroxide of the metal in a proportion of not less than 1.5% by mass with respect to the fine particles of the hydroxide of the metal. According to this arrangement, the ratio of mixing the fine particles of the carbon with the metal hydroxide is suitably determined, and the agglomerate of the metal hydroxide can be effectively pulverized into the primary grains. Even when the amount of the fine particles of the carbon to be mixed is larger than required for pulverizing the secondary grains into the primary grains, it is possible to obtain the fine particles of the metal oxide having the nanoscale grain size although the excessive amount of the fine particles of the carbon is wasted. In essence, the upper limit of the amount of the fine particles of the carbon is not particularly limited, provided that the mixing ratio or proportion of the fine particles of the carbon with respect to the metal hydroxide assures that the entire amount of the secondary grains of the metal hydroxide are pulverized into the primary grains.

In another preferred form of the present invention, the fine particles of the carbon have a primary grain size of 1–50 nm. According to this arrangement, the grain size of the fine particles of the carbon is sufficiently small, assuring a high degree of dispersion thereof in the fine particles of the metal hydroxide. Therefore, the entire amount of the secondary grains of the metal hydroxide can be efficiently pulverized into the primary grains by addition of a relatively small amount of the fine particles of the carbon. If the primary grain size of the fine particles of the carbon is less than 1 nm, the fine particles of the carbon are not likely to be uniformly mixed with the metal hydroxide due to aggregation or cohesion, for instance.

In still another preferred form of the present invention, the fine particles of the carbon has a turbostratic structure. The fine particles of the carbon having the turbostratic structure exhibit a high degree of fluidity, for thereby assuring a high degree of dispersion in the metal hydroxide.

In yet another preferred form of the present invention, the metal consists of at least one element selected from the group consisting of silicon, manganese, zirconium, chromium, iron, nickel, tin, zinc, indium, aluminum, cerium, magnesium, and titanium. Since each of the hydroxides of these elements is insoluble in water, the precipitated hydroxide can be easily collected, permitting easy production of the oxide. Each of the oxides of tin, zinc, and indium functions as a conductive material, and is effective to improve the performance and reduce the cost of the parts which are required to exhibit a high degree of conductivity while assuring a high degree of production efficiency. Each of the oxides of silicon, manganese, zirconium, chromium, iron, nickel, aluminum, cerium, magnesium, and titanium functions as an insulating material, and can be also used as a material of the grinding stones, assuring a high degree of performance and production efficiency in those applications.

In a further preferred form of the present invention, the step of preparing the acidic solution comprises a step of dissolving a salt of the metal in a solvent. According to this arrangement, the acidic solution which contains the metal ion can be easily prepared by dissolving the salt of the specific metal in a suitable solvent. More preferably, the salt of the metal is selected from the group consisting of nitrate, carbonate, sulfate, acetate, and chloride.

In a still further preferred form of the present invention, the alkaline solution is an ammonia water.

In a yet further preferred form of the present invention, the predetermined temperature at which the step of heat-treating the mixture is effected is selected within a range of 500–1000° C.

BRIEF DESCRIPTION OF THE DRAWINGS

The above and other objects, features, advantages and technical and industrial significance of the present invention will be better understood by reading the following detailed description of presently preferred embodiments of the invention, when considered in connection with the accompanying drawings, in which.

DETAILED DESCRIPTION OF PREFERRED EMBODIMENTS

Figure 1:
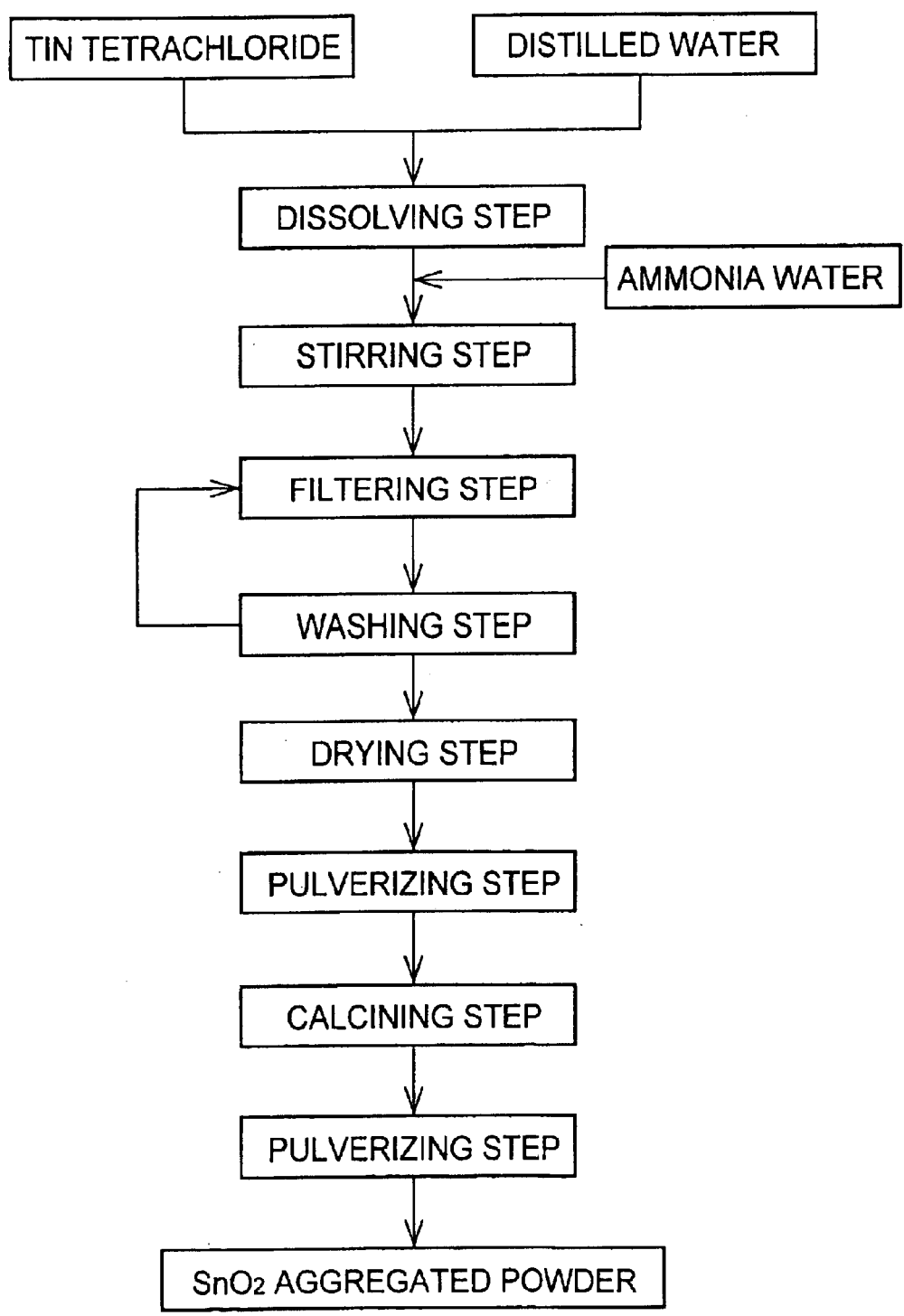
FIG. 1 is a view illustrating conventional process steps for producing the powder of the tin oxide.

The method of producing fine particles of an oxide of a metal according to the present invention comprises the steps of: preparing an acidic solution which contains ions of the metal; precipitating fine particles of a hydroxide of the metal; collecting the precipitated fine particles of the hydroxide of the metal; mixing fine particles of a carbon with the collected hydroxide of the metal; and heat-treating a mixture of the carbon and the hydroxide of the metal. The fine particles of the oxide of the metal (metal oxide) produced according to the present invention are used as materials of the electronic ceramics, the new-type functional ceramics, the grinding stones, etc. The present method is applicable to the production of the fine particles of the metal oxide used for other applications. Any metals can be used in the present method as long as each of the metals forms a hydroxide which is insoluble or slightly soluble in the solvent that constitutes the acidic solution.

The acidic solution may be prepared in various manners, provided that the prepared acidic solution contains the ions of the specific metal which constitutes the intended metal oxide. For instance, the acidic solution may be prepared by: dissolving a chloride in a solvent as effected in the above-described conventional chemical process using the inorganic salt; dissolving, in a solvent, a metal compound which includes various inorganic salts such as nitrate, sulfate, and carbonate, and various organic salts such as acetate; dissolving a metal in an acid; or adding an acid to a chelate (complex). When the acidic solution is obtained by dissolving the metal compound in the solvent, the metal compound may have a spinel structure or a perovskite structure, for instance.

When the acidic solution is prepared by dissolving the metal compound in the solvent, the metal compound as the starting material is a suitable salt of the specific metal which constitutes the fine particles of the metal oxide as the final product. For instance, the metal compound as the starting material is selected from among: tin tetrachloride ($SnCl_4$) for forming tin oxide ($SnO_2$); zinc chloride ($ZnCl_2$) for forming zinc oxide (ZnO); aluminum chloride ($AlCl_3$) or aluminum acetate ($Al(CH_3COO)_3$) for forming aluminum oxide ($Al_2O_3$); cerium nitrate ($Ce(NO_3)_3$) or cerium chloride ($CeCl_3$) for forming cerium oxide ($CeO_2$); chromium acetate ($Cr(CH_3COO_3)$) for forming chromium oxide ($Cr_2O_3$); manganese acetate ($Mn(CH_3COO)_3$) for forming manganese oxide ($MnO_2$). In addition, sulfate and carbonate may be used. The solvent in which the salt of the metal is dissolved is distilled water, for instance, to which a water-soluble alcohol may be added. The mixing ratio of the solvent and the salt of the metal, in other words, the concentration of the acidic solution (metal solution) is suitably determined based on a preliminary experiment, for instance, depending upon the desired grain size of the metal hydroxide, for instance.

When the acidic solution is obtained by dissolving the metal in the acid, nickel or iron is dissolved in hydrochloric acid (HCl solution), for instance. The acidic solution obtained by reacting the nickel and the hydrochloric acid includes nickel ions ($Ni^{2+}$), while the acidic solution obtained by reacting the iron and the hydrochloric acid includes iron ions ($Fe^{2+}$). The metal may take any suitable forms such as a plate and powder.

As the chelate which is reacted with the acid such as hydrochloric acid to provide the acidic solution, an ethylenediaminetetraacetato complex constituted by ethylenediaminetetraacetic acid and nickel, or a Ni-adsorbed iminodiacetic acid-type chelate resin is used, for instance. By reacting each of the chelates and the hydrochloric acid, the $Ni^{2+}$ ions are emitted or released, so that the obtained acidic solution contains the $Ni^{2+}$ ions.

As the alkaline solution to be added to the acidic solution for precipitating the metal hydroxide, the ammonia water is suitably used, for example. Any other alkaline solutions such as water-soluble amines may be used, as long as the acidic solution is changed into alkali with a pH value (hydrogen ion exponent) which is determined for each of the individual metals, so as to be suitable for precipitating the hydroxide of the metal, and the metal hydroxide is precipitated and collected without being adversely influenced by the alkaline solution. The ammonia water described above satisfies those conditions, and can be suitably used as the alkaline solution in the present method. Since the grain size of the metal hydroxide to be precipitated is influenced by the kind of the metal and the pH of the mixed solution of the acidic solution and the alkaline solution, the concentration and amount of the alkaline solution are suitably determined depending upon the desired grain size of the metal hydroxide.

The precipitated metal hydroxide may be collected from the mixed solution of the acidic solution and the alkaline solution in any manners, provided that the metal hydroxide can be selectively collected therefrom. For instance, the step of collecting the precipitated metal hydroxide comprises steps of filtration and washing. By filtering and washing the precipitated metal hydroxide, the anions present in the acidic solution and the cations derived from the alkaline solution are removed, so that only the metal hydroxide can be effectively collected. Alternatively, the metal hydroxide may be collected by centrifugation.

As the fine particles of the carbon to be mixed with the collected metal hydroxide, so-called carbon black in a powder form is used. The carbon black used in the present method has a primary grain size of about 1–50 nm, exhibits a high degree of fluidity, and has a turbostratic structure of the carbon. Such carbon black exhibits a good dispersion property in water, and is likely to be oxidized into $CO_2$. In other words, the carbon black can be easily burnt out. In view of the dispersion property, the powdery carbon black rather than the granular carbon black is preferably used.

The mixture of the metal hydroxide and the fine particles of the carbon is dried to such an extent that the water component remaining in the agglomerate of the metal hydroxide can be removed. Thereafter, the dried mixture is heat-treated for crystallization in a non-reducing atmosphere at a predetermined temperature at which the oxide is produced from the hydroxide. The drying and firing temperatures are suitably determined depending upon the kind of the metal and the grain size of the metal hydroxide such that the oxide can be effectively produced and such that the crystal growth does not excessively proceed. For obtaining the sintered body of the tin oxide, for instance, the drying temperature is selected within a range of about 50–200° C., while the firing temperature is selected within a range of about 500–1000° C. The heat-treatment is effected in the non-reducing atmosphere such as an oxidizing atmosphere or the atmosphere.

There will be described some embodiments of the invention referring to the drawings.

Figure 2:
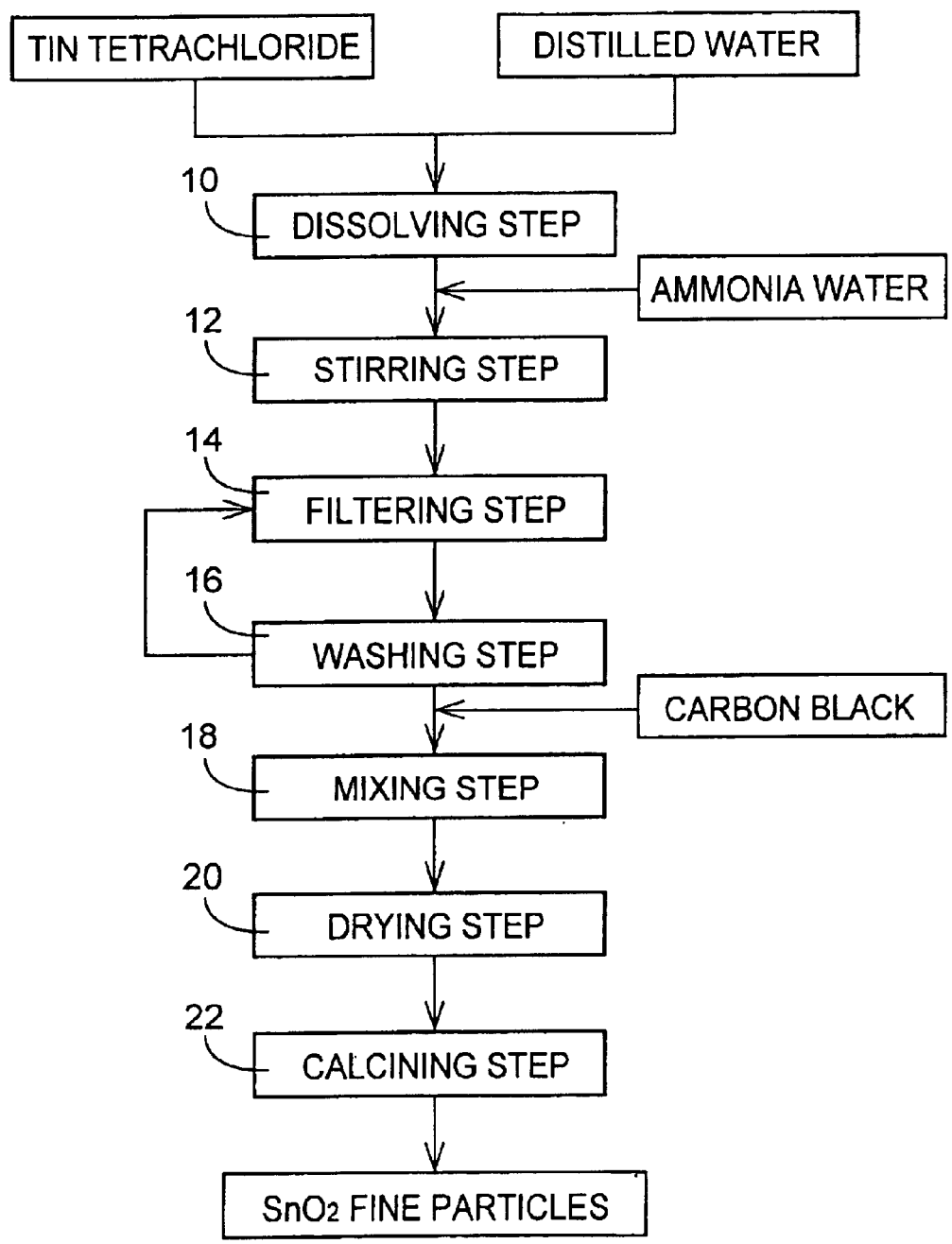
FIG. 2 is a view illustrating process steps for producing the powder of the tin oxide according to one embodiment of the present invention.

FIG. 2 shows the process steps for producing the fine particles of the tin oxide, according to one embodiment of the invention, by using, as the starting material, the tin tetrachloride which is a salt of the tin. In a dissolving step 10, 18 g of tin tetrachloride pentahydrate is dissolved in 500 ml of distilled water by stirring, for thereby providing a tin tetrachloride solution having a concentration of about 2.6%. In this solution, the tin tetrachloride is ionized into tin ions $Sn^{4+}$ and chlorine ions $Cl^-$. In the present embodiment, the ionized aqueous solution is used as a starting material for the synthesis of the fine particles of the tin oxide. This dissolving step 10 corresponds to the step of preparing the acidic solution. The dissolving step 10 is followed by a stirring step 12 in which 20 ml of 25% ammonia water, for instance, is added by dripping to the prepared solution, so that the tin hydroxide $(Sn(OH)_4)$ is precipitated in the form of a white deposit. This reaction is represented by the following formula (1). This stirring step 12 corresponds to the precipitating step.

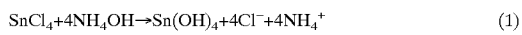

$$SnCl_4 + 4NH_4OH \rightarrow Sn(OH)_4 + 4Cl^- + 4NH_4^+ \quad (1)$$

The precipitated tin hydroxide takes the form of nanograins whose average grain size is about several nanometers (nm). In the solution in which the tin hydroxide is precipitated, chlorine ions $Cl^-$ and ammonium ions $NH_4^+$ are present.

In the following filtering step 14 and washing step 16, the aqueous solution in which the white deposit is precipitated is subjected to a filtration treatment, and the obtained deposit is washed with distilled water several times (e.g., three times), so that the tin hydroxide is collected. Namely, the impurities such as the ammonium ions and the chloride ions are removed from the deposit. The filtering step 14 and the washing step 16 correspond to the step of collecting the metal hydroxide. The thus collected tin hydroxide is in the form of an agglomerate of the fine particles of the tin hydroxide (the inorganic salt) having a slight degree of fluidity, and contains the tin in a concentration of about 5%, as calculated of the tin oxide.

In the following mixing step 18, 1 g of the carbon black is mixed with 6 g of the agglomerate of the fine particles of the tin hydroxide. The proportion of the carbon black to the tin hydroxide is about 17% by mass per 100% by mass of the tin hydroxide, and about 100% by volume per 100% by volume of the tin hydroxide. The carbon black and the tin hydroxide are mixed together by using a mixer, a roller, or a mortal, for instance.

The mixing step 18 is followed by a drying step 20 in which the agglomerate of the tin hydroxide in which the carbon black has been mixed is dried in the atmosphere at a predetermined temperature for a predetermined time period which permit the aqueous component included in the agglomerate to be sufficiently removed therefrom. For instance, the agglomerate is dried at about 70° C. for about 18 hours. In the agglomerate which has been dried, the tin and the oxygen are loosely bonded to each other, so that a broad peak of the tin oxide is confirmed by X-ray diffraction.

In the next calcining step 22 followed by the drying step 20, the dried agglomerate is heat-treated in the atmosphere, i.e., in a non-reducing atmosphere, at a predetermined temperature for a predetermined time period which permit the tin hydroxide to be formed into the tin oxide. For instance, the dried agglomerate is heat-treated at about 600° C. for about 2 hours. By this heat-treatment, the tin oxide is formed, and the dried agglomerate is broken down into the particles. The thus obtained tin oxide is in the form of a monodisperse powder whose average grain size is about 50 nm. In the present embodiment, the calcining step 22 corresponds to the step of heat-treating which may comprise the drying step 20.

In the present embodiment described above, the fine particles of the tin hydroxide precipitated in the stirring step 12 and collected in the filtering step 14 and the washing step 16 are mixed with the fine particles of the carbon in the mixing step 18, and finally formed into the fine particles of the tin oxide by the heat-treatment in the non-reducing atmosphere effected in the calcining step 22. In the present embodiment, the fine particles of the carbon are mixed with the fine particles of the tin hydroxide prior to the heat-treatment such as the drying step 20 and the calcining step 22 in the synthesis of the fine particles of the tin oxide according to the chemical process using the inorganic salt. According to this arrangement, the fine particles of the carbon prevent the formation of the coarse secondary grains due to the bonding of the fine particles of the tin hydroxide. Therefore, the obtained fine particles of the tin oxide have a nanoscale grain size derived from or owing to the grain size of the precipitated tin hydroxide. According to the present method, the fine powder can be produced by a simple aqueous synthesis without complicating the process steps and requiring any special material and equipment. Thus, the present method permits the mass-production of the fine powder at a relatively low cost without giving any serious damage to the environment.

The fine powder of the tin oxide produced as described above can be used for the electronic ceramics such as a varistor or a thermistor, and the new-type ceramics having a new functionality utilizing the quantum effect.

The following experiment was conducted to confirm the effect of the fine particles of the carbon as described in the illustrated embodiment. There were obtained three specimens (Nos. 1–3) of the tin oxide particles according to the method in the illustrated embodiment, by using different amounts of the fine particles of the carbon, as indicated in the following Table 1. Namely, each of the specimens was obtained by adding, to 6 g of an agglomerate of the tin hydroxide, the fine particles of the carbon in the predetermined amount indicated in the Table 1 after the agglomerate of the tin hydroxide has been washed. The conditions of the obtained tin oxide particles were evaluated, and the results of the evaluation are also indicated in the Table 1.

TABLE 1

| Specimen No. | Amount of the carbon (g) | Condition of the tin oxide |
| --- | --- | --- |
| No. 1 (Comparative example) | 0 | agglomerate of polycrystal |
| No. 2 (Comparative example) | 0.1 | small agglomerate of polycrystal |
| No. 3 (Present invention) | 1.0 | fine particles |

It is apparent from the results indicated in the above Table 1 that the grain size of the fine particles of the tin oxide to be obtained can be made small by adding the fine particles of the carbon to the tin hydroxide. It is noted, however, that the grain size of the tin oxide particles inevitably increases during the calcination if the amount of the fine particles of the carbon to be added is about 0.1 g, i.e., about 1.5% by mass per 100% by mass of the tin hydroxide, and 10 vol % per 100 vol % of the tin hydroxide. In view of this, the amount of the fine particles of the carbon to be added is preferably not less than 1.5% by mass, in other words, not less than 10 vol %, of the tin hydroxide.

The tin oxide particles according to the specimen No. 2 take the form of the small agglomerate of the polycrystal. This is because the fine particles of the carbon were not uniformly dispersed in the tin hydroxide due to the insufficient amount of the carbon, and the agglomerate was not sufficiently pulverized since the pressure of the $CO_2$ gas was undesirably low due to the insufficient amount of the $CO_2$ gas generated by the oxidization of the carbon particles. It is possible, however, to obtain sufficiently fine powder of the tin oxide by addition of the carbon particles in an amount as small as 0.1 g, if the mixture of the tin hydroxide and the carbon is dried under the condition that prevents or minimizes the bonding of the particles of the tin hydroxide. Further, if the fine particles of the carbon are mixed with the tin hydroxide such that the fine particles of the carbon can be uniformly dispersed in the tin hydroxide, it is expected that the tin oxide particles to be obtained will have a grain size as small as that of the tin oxide particles obtained by adding the fine particles of the carbon in an amount of about 1.0 g.

Figure 3:
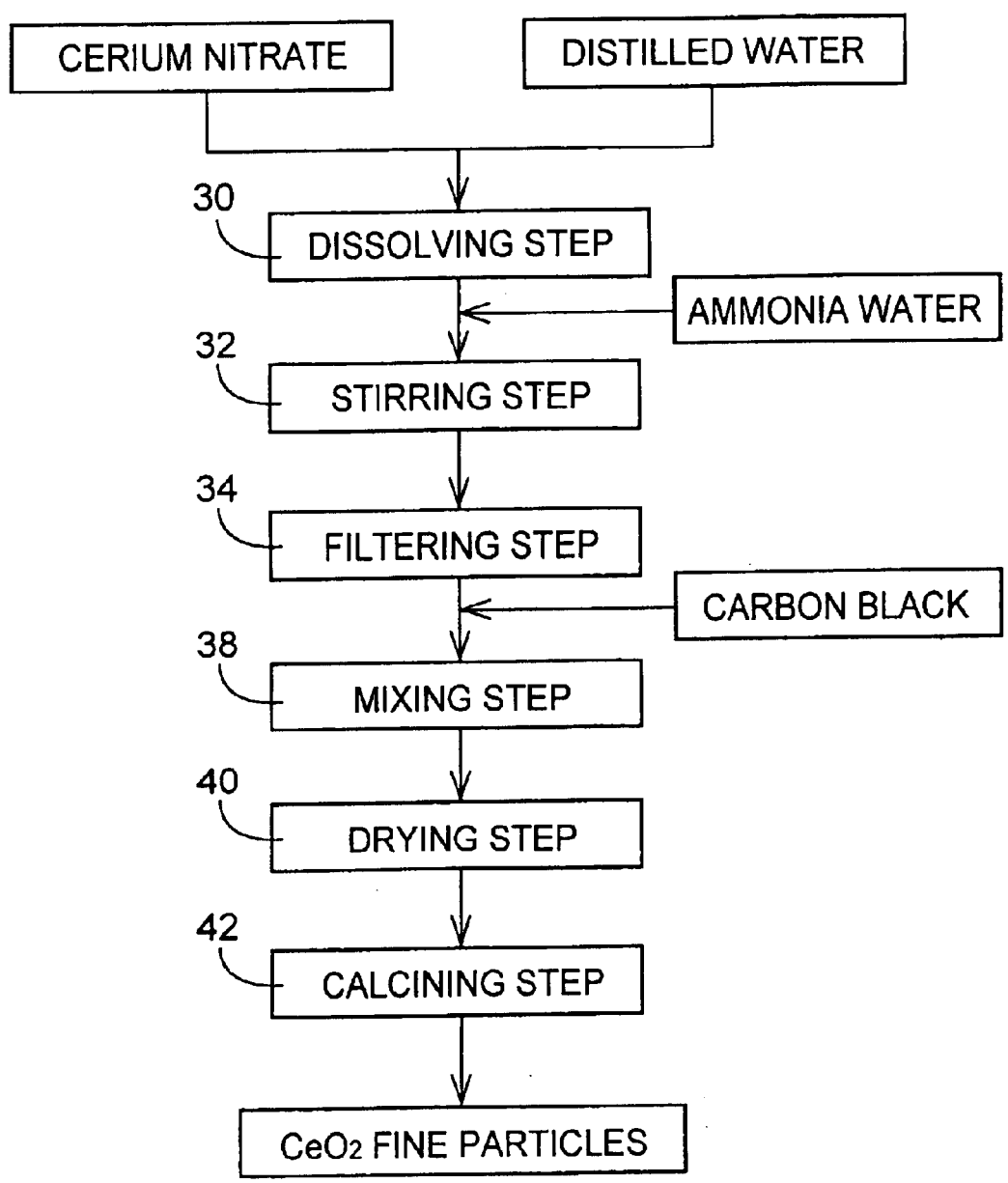
FIG. 3 is a view illustrating process steps for producing the powder of the cerium oxide according to another embodiment of the present invention.

Referring next to FIG. 3, there will be explained the process steps for producing a cerium oxide, according to another embodiment of the present invention, by using a cerium nitrate as the starting material. In the process steps of FIG. 3, only the starting material and the final product are different from those in the process steps of FIG. 2, except that the process steps of FIG. 3 do not include the washing step 16 as included in the process steps of FIG. 2.

In a dissolving step 30, 22 g of cerium nitrate hexahydrate is dissolved in 500 ml of a distilled water by stirring, for thereby providing a colorless and transparent cerium nitrate solution. Like the tin tetrachloride in the illustrated first embodiment, the cerium nitrate in the solution of this embodiment is ionized into cerium ions $Ce^{3+}$ and nitric acid ions $NO_3^-$. This dissolving step 30 corresponds to the step of preparing the acidic solution. The dissolving step 30 is followed by a stirring step 32 in which 50 ml of 25% ammonia water, for instance, is added by dripping to the prepared solution, so that a cerium hydroxide ($Ce(OH)_3$) is precipitated in the form of a brown deposit according to the neutralization reaction similar to that represented by the above formula (1). The precipitated cerium hydroxide takes the form of nanograins whose average grain size is about several nanometers (nm). This stirring step 32 corresponds to the step of precipitating the metal hydroxide.

The stirring step 32 is followed by a filtering step 34 wherein the solution in which the brown deposit has been precipitated is subjected to suction filtration, whereby the precipitated cerium hydroxide is collected. The collected cerium hydroxide takes the form of an aggrometate of the fine particles of the cerium hydroxide (inorganic salt), which exhibits a slight degree of fluidity. Since the cerium hydroxide can be present only in a basic solution (pH>7), the precipitated cerium hydroxide will be redissolved by water-washing, making it difficult to collect the precipitated cerium hydroxide. Even when the precipitated cerium hydroxide is not washed with water, it will be difficult to collect the cerium hydroxide if the pH of the solution is lowered due to a decrease of the ammonia after the solution has been left untreated for a relatively long period of time. In view of the above, it is necessary, in producing the cerium oxide according to the present embodiment, to collect the deposit from the solution without water-washing immediately after the cerium hydroxide has been precipitated. In the collected deposit, the nitric acid ions $NO_3^-$ and ammonium ions $NH_4^+$ are included. The filtering step 34 corresponds to the step of collecting the metal hydroxide.

In the following mixing step 38, 1.1 g of the carbon black is mixed with 7 g of the agglomerate of the cerium hydroxide particles. The proportion of the carbon black to the cerium hydroxide is about 16% by mass per 100% by mass of the cerium hydroxide, and about 100% by volume per 100% by volume of the cerium hydroxide. The carbon black and the cerium hydroxide are mixed together by using a mixer, a roller, or a mortal, for instance. The amount of the carbon added to the cerium hydroxide is substantially the same as that in the preceding first embodiment for producing the tin oxide.

The mixing step 38 is followed by a drying step 40 wherein the agglomerate of the cerium hydroxide in which the carbon black is mixed is dried in the atmosphere at a predetermined temperature for a predetermined time period which permit the aqueous component included in the agglomerate to be sufficiently removed therefrom. For instance, the agglomerate is dried at about 70° C. for about 18 hours. In the agglomerate which has been dried, the cerium and the oxygen are loosely bonded to each other, so that a broad peak of the cerium oxide is confirmed by X-ray diffraction.

In the next calcining step 42 followed by the drying step 40, the dried agglomerate is heat-treated in the atmosphere, i.e., in a non-reducing atmosphere, at a predetermined temperature for a predetermined time period which permit the cerium hydroxide to be formed into the cerium oxide. For instance, the dried agglomerate is heat-treated at about 600° C. for about 2 hours. By this heat-treatment, the impurities such as nitric acid ions and ammonium ions present in the cerium hydroxide are removed. Like the tin oxide described in the first embodiment, the cerium oxide obtained in this embodiment is in the form of a monodisperse fine powder. In the present embodiment, the calcining step 42 corresponds to the step of heat-treating which may comprise the drying step 40.

In the synthesis of the fine particles of the cerium oxide which utilizes the chemical process using the inorganic salt, the fine particles of the carbon are mixed with the fine particles of the cerium hydroxide prior to the heat-treatment such as the drying step 40 and the calcining step 42 in the present embodiment. According to this arrangement, the fine particles of the carbon prevent the formation of the coarse secondary grains due to the bonding of the fine particles of the cerium hydroxide. Therefore, the present method permits a simplified production of the fine particles of the cerium oxide having a nanoscale grain size derived from or owing to the grain size of the precipitated cerium hydroxide. In the method of the present embodiment, the cerium nitrate as the starting material may be replaced with cerium chloride for obtaining the fine powder of the cerium oxide.

While the presently preferred embodiments of this invention have been described in detail by reference to the drawings, it is to be understood that the invention may be otherwise embodied.

In the illustrated embodiments, the principle of the present invention is applied to the methods of producing the tin oxide powder and cerium oxide powder suitably used for the electronic ceramics. The principle of the invention may be applied to the production of fine powders of various metal oxides for various applications where the reduction of the grain size of the material and accordingly, the reduction of the crystal grain size improve the operating performance of the product which utilizes the fine powders. For instance, if the metal oxide used for the abrasive grains is formed according to the present invention, the obtained metal oxide powder can be suitably used for the material of the grinding stone.

In the illustrated embodiments, the fine powder of the carbon is in a powder form. The shape and physical properties of the fine particles of the carbon may be suitably changed depending upon the kind of the metal oxide such that the powder of the metal oxide to be obtained have a desired grain size. For instance, the fine particles of the carbon may be in a granular form.

Although the chloride and the nitrate are used as the starting material in the illustrated embodiments, a suitable salt of a specific metal such as acetate or sulfate, a metal, a chelate, etc. may be used as the starting material for obtaining the fine powder of the metal oxide.

It is to be understood that the present invention may be embodied with various other changes, modifications and improvement, which may occur to those skilled in the art, without departing from the spirit and scope of the invention defined in the following claims:

What is claimed is:

1. A method of producing fine powder of an oxide of a metal, comprising the steps of:

preparing an acidic solution which contains ions of said metal;

precipitating fine particles of a hydroxide of said metal by adding an alkaline solution to said acidic solution;

collecting said fine particles of said hydroxide of said metal precipitated in a mixed solution of said acidic solution and said alkaline solution;

mechanically mixing fine particles of carbon with the collected fine particles of said hydroxide of said metal; and heat-treating a mixture of said fine particles of said hydroxide of said metal and said fine particles of said carbon at a predetermined temperature to burn out fine particles of said carbon in a non-reducing atmosphere, whereby said fine powder of said oxide of said metal is produced.

2. A method according to claim 1, wherein said fine particles of said carbon are mixed with said fine particles of said hydroxide of said metal in a proportion of not less than 1.5% by mass with respect to said fine particles of said hydroxide of said metal.

3. A method according to claim 1, wherein said fine particles of said carbon have a primary grain size of 1–50 nm.

4. A method according to claim 1, wherein said fine particles of said carbon has a turbostratic structure.

5. A method according to claim 1, wherein said metal consists of at least one element selected from the group consisting of silicon, manganese, zirconium, chromium, iron, nickel, tin, zinc, indium, aluminum, cerium, magnesium, and titanium.

6. A method according to claim 1, wherein said step of preparing said acidic solution comprises a step of dissolving a salt of said metal in a solvent.

7. A method according to claim 6, wherein said salt of said metal is selected from the group consisting of nitrate, carbonate, sulfate, acetate and chloride.

8. A method according to claim 1, wherein said alkaline solution is ammonia water.

9. A method according to claim 1, wherein said predetermined temperature at which said step of heat-treating said mixture is effected is selected within a range of 500–1000° C.

* * * * *